US012747703B2

(12) United States Patent
Gover

(10) Patent No.: US 12,747,703 B2
(45) Date of Patent: Sep. 29, 2026

(54) BAFFLE ASSEMBLY WITH VIBRATION DAMPING FOR INTERACTING WITH LUBRICATING FLUID

(71) Applicant: PRATT & WHITNEY CANADA CORP., Longueuil (CA)

(72) Inventor: Christopher Gover, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/924,228

(22) Filed: Oct. 23, 2024

(65) Prior Publication Data

US 2026/0110267 A1 Apr. 23, 2026

(51) Int. Cl.
*F02C 7/36* (2006.01)
*F02C 7/06* (2006.01)

(52) U.S. Cl.
CPC .................. *F02C 7/36* (2013.01); *F02C 7/06* (2013.01); *F05D 2220/323* (2013.01); *F05D 2260/4031* (2013.01); *F05D 2260/609* (2013.01); *F05D 2260/96* (2013.01)

(58) Field of Classification Search
None
See application file for complete search history.

(56) References Cited

U.S. PATENT DOCUMENTS 3,788,426 A 1/1974 Hull
7,686,137 B2 * 3/2010 Tominaga ........... F16H 57/0408 184/6.12
7,984,791 B2 7/2011 Taguchi
9,772,027 B2 9/2017 Preston et al.
11,073,043 B2 7/2021 Guillemont
11,339,724 B2 5/2022 Di Giovanni
11,365,798 B1 6/2022 Rejman
2006/0179973 A1 * 8/2006 Matsufuji ........... F16H 57/0447 74/606 R
2021/0190200 A1 * 6/2021 Itou ......................... F16H 55/17
2023/0296168 A1 9/2023 Marcos Izquierdo

FOREIGN PATENT DOCUMENTS

EP 4036389 A1 8/2022
FR 3133654 B1 9/2023
WO 2014022396 A1 2/2014

* cited by examiner

*Primary Examiner* — Phutthiwat Wongwian
*Assistant Examiner* — Jacek Lisowski
(74) *Attorney, Agent, or Firm* — Norton Rose Fulbright Canada LLP

(57) ABSTRACT

A baffle assembly for interacting with a lubricating fluid around a rotor in an aircraft power plant is disclosed. The baffle assembly may mitigate misting of lubricating fluid inside a gearbox and improve the effectiveness of the lubricating fluid. The baffle assembly includes a first sidewall configured to be fastened to a first structure disposed to a first side of the rotor, a second sidewall configured to be fastened to a second structure disposed to a second side of the rotor axially opposite the first side of the rotor, and a baffle. The baffle is supported by and extends between the first sidewall and the second sidewall so that the baffle is disposed at a position adjacent to and radially outwardly of the rotor during use. A vibration damper engaged with the baffle to dampen a vibration of the baffle during use.

15 Claims, 13 Drawing Sheets

BAFFLE ASSEMBLY WITH VIBRATION DAMPING FOR INTERACTING WITH LUBRICATING FLUID

TECHNICAL FIELD

The disclosure relates generally to aircraft power plants, and more particularly to baffles for interacting with lubricating fluid in aircraft power plants.

BACKGROUND

A gas turbine engine may include a gearbox for coupling one of its spools to a load. The gearbox may include gears interacting with a lubricating fluid. The interaction of the gear(s) with the lubricating fluid can sometimes induce misting of the lubricating fluid. Such interaction with the lubricating fluid may be undesirable as it can cause energy losses and aeration of the lubricating fluid, which can reduce the effectiveness of the lubricating fluid and the ability to scavenge the lubricating fluid. A baffle may be installed to partially shroud a gear to mitigate misting of the lubricating fluid caused by the rotation of the gear. However, due to space constraints and vibrations that may be induced inside gearboxes, the design and installation of effective baffles can be challenging.

SUMMARY

In one aspect, the disclosure describes a baffle assembly for interacting with a lubricating fluid around a rotor in an aircraft power plant. The baffle assembly comprises:

- a first sidewall configured to be fastened to a first structure disposed to a first side of the rotor;
- a second sidewall configured to be fastened to a second structure disposed to a second side of the rotor axially opposite the first side of the rotor;
- a baffle supported by and extending between the first sidewall and the second sidewall, and to be disposed at a position adjacent to and radially outwardly of the rotor during use; and
- a vibration damper engaged with the baffle to dampen a vibration of the baffle during use.

The vibration damper may include an elastomeric body engaged with the baffle.

The elastomeric body may be received into a receptacle defined in the first sidewall.

The elastomeric body may encapsulate an edge of the baffle.

The elastomeric body may extend completely around a periphery of the baffle.

The elastomeric body may be press-fitted in the receptacle defined in the first sidewall.

The elastomeric body may penetrate a perforation defined in the baffle.

The vibration damper may be disposed between the baffle and the first sidewall.

The vibration damper may be a first vibration damper. The baffle assembly may include a second vibration damper disposed between the baffle and the second sidewall.

The first vibration damper and the second vibration damper may be part of a polymeric body encapsulating a peripheral edge of the baffle. The polymeric body may be received into a first channel defined in the first sidewall. The polymeric body may be received into a second channel defined in the second sidewall.

The second sidewall may include a guide surface for leading the polymeric body toward the second channel during assembly of the baffle with the second sidewall.

The first channel and the polymeric body may be sized to define an interference fit between the first channel and the polymeric body.

Embodiments may include combinations of the above features.

In another aspect, the disclosure describes a method of installing a baffle for interacting with a lubricating fluid in an aircraft power plant. The method comprises:

- mounting a first side of the baffle to a first structure disposed to a first side of a rotor rotatable about a rotation axis; and
- mounting a second side of the baffle to a second structure disposed to a second side of the rotor so that the baffle is positioned adjacent to and radially outward of the rotor during use, the second structure being axially spaced apart from the first structure by an axial distance along the rotation axis of the rotor, wherein:

- mounting the first side of the baffle includes installing a first vibration damper between the baffle and the first structure; and/or
- mounting the second side of the baffle includes installing a second vibration damper between the baffle and the second structure.

The method may comprise: installing the first vibration damper between the baffle and the first structure; and installing the second vibration damper between the baffle and the second structure.

The first vibration damper may encapsulate a first edge of the baffle. The second vibration damper may encapsulate a second edge of the baffle.

The method may include installing the first vibration damper between the baffle and the first structure. The first vibration damper may encapsulate a first edge of the baffle. Mounting the first side of the baffle to the first structure may include: fastening a first sidewall to the first structure; and inserting the first vibration damper into a first receptacle defined in the first sidewall.

The method may include installing the second vibration damper between the baffle and the second structure. The second vibration damper may encapsulate a second edge of the baffle. Mounting the second side of the baffle to the second structure may include: fastening a second sidewall to the second structure; and inserting the second vibration damper into a second receptacle defined in the second sidewall.

The method may comprise installing the rotor after mounting the first side of the baffle to the first structure and before mounting the second side of the baffle to the second structure.

Embodiments may include combinations of the above features.

In a further aspect, the disclosure describes a method of installing a baffle for interacting with a lubricating fluid inside a gearbox of an aircraft power plant. The method comprises:

- fastening a first sidewall to a first structure disposed to a first side of a gear rotatable about a rotation axis;
- fastening a second sidewall to a second structure disposed to a second side of the gear, the second sidewall being axially spaced apart from the first sidewall by an axial distance along the rotation axis of the gear; and
- supporting the baffle using the first sidewall and the second sidewall at a position adjacent to and radially outwardly of the gear, supporting the baffle including supporting the baffle via one or more vibration dampers disposed between the baffle and one or both of the first sidewall and the second sidewall.

The one or more vibration dampers may include a resilient body encapsulating an edge of the baffle. The method may include receiving the resilient body and the edge of the baffle in a receptacle defined in the first sidewall or in the second sidewall.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The present disclosure describes baffle assemblies for interacting with lubricating fluid, gearboxes including such baffle assemblies, and methods for installing such baffle assemblies. In some embodiments, the baffle assemblies described herein may interact with lubricating fluid during use while also accommodating installation constrains and mitigating vibrations induced inside gearboxes. For example, the baffle assemblies may have a multi-piece construction to facilitate installation in small spaces. In some embodiments, the baffle assemblies may include one or more vibration dampers to mitigate vibration during use.

Aspects of various embodiments are described through reference to the drawings.

The term "mounting" may include both direct mounting (in which two elements contact each other) and indirect mounting (in which at least one additional element is located between the two elements). The term "substantially" as used herein may be applied to modify any quantitative representation which could permissibly vary without resulting in a change in the basic function to which it is related. As used herein, the singular forms "a," "an," and "the" are intended to include the plural forms as well, unless the context clearly indicates otherwise.

Figure 1:
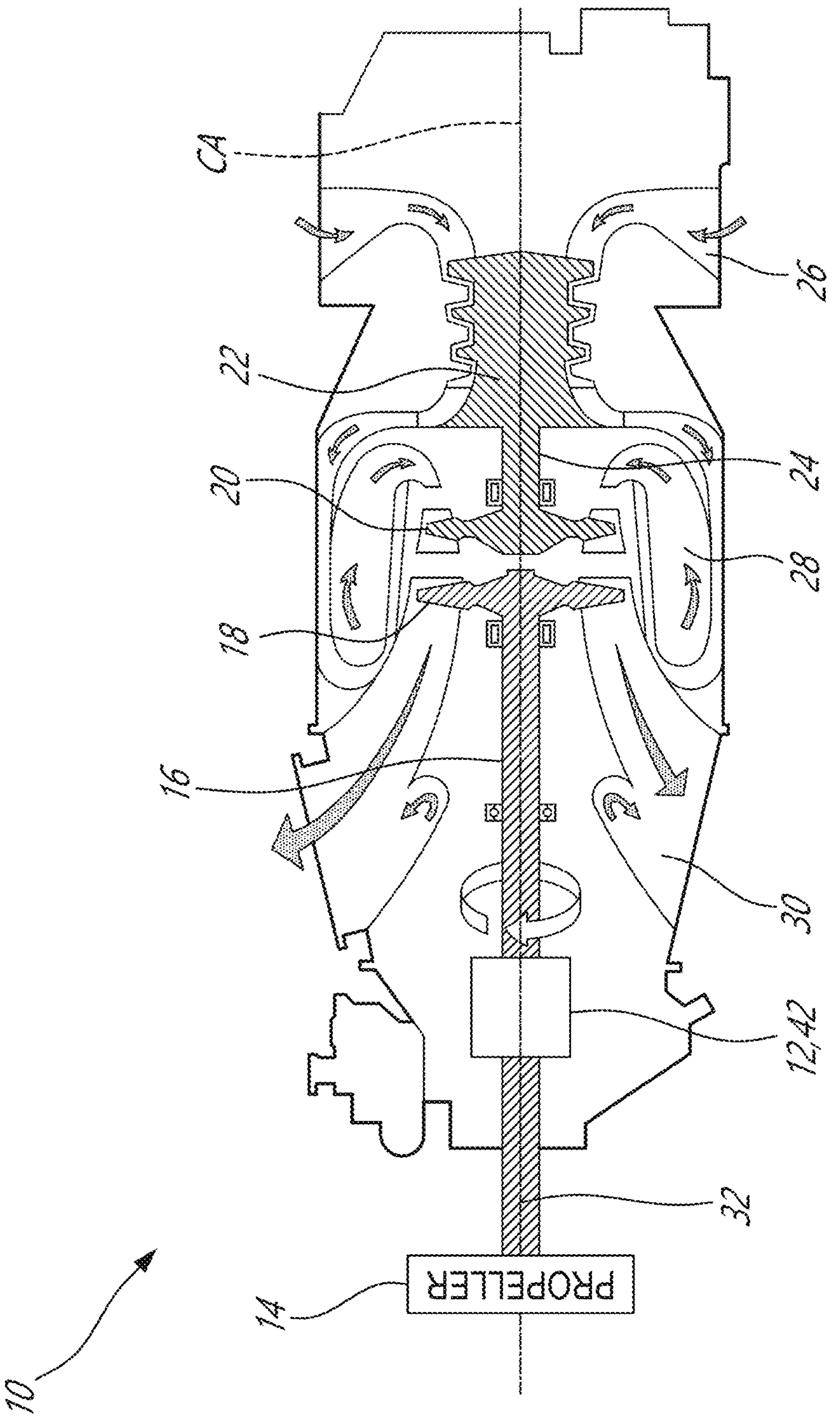
FIG. 1 shows a schematic axial cross-sectional view of an exemplary turboprop gas turbine engine including a gearbox with one or more baffle assemblies as described herein.

FIG. 1 is a schematic axial cross-sectional view of an exemplary reverse flow turboprop gas turbine engine 10 (referred hereinafter as "engine 10") as an exemplary aircraft power plant. Even though the following description and FIG. 1 specifically refers to a turboprop gas turbine engine as an example, it is understood that the baffle assemblies described herein may be suitable for use in other types of gas turbine engines including turboshaft and turbofan gas turbine engines. The baffle assemblies described herein may be also be suitable for other types of aircraft power plants including hybrid aircraft power plants and electric aircraft power plants.

Engine 10 may include one or more gearboxes 12, as described herein. Engine 10 may be of a type preferably provided for use in subsonic flight to drive a load such as propeller 14 via gearbox 12 drivingly coupled to low-pressure shaft 16 (sometimes called "power shaft") further drivingly coupled to low-pressure turbine 18. Compressor 22 may draw ambient air into engine 10 via annular radial air inlet duct 26, increase the pressure of the drawn air and deliver the pressurized air to combustor 28 where the pressurized air is mixed with fuel and ignited to generate an annular stream of hot combustion gas. High-pressure turbine 20 may extract energy from the hot expanding combustion gas and thereby drive compressor 22 via high-pressure shaft 24. The hot combustion gas leaving high-pressure turbine 20 may be accelerated as it further expands, flows through and drives low-pressure turbine 18. The combustion gas may then exit engine 10 via exhaust duct 30.

Low-pressure shaft 16 may be drivingly coupled to propeller 14 or another load via gearbox 12 and propeller shaft 32. Gearbox 12 may be of a speed-reducing type so that the rotation speed of propeller shaft 32 may be lower than that of low-pressure shaft 16. Engine 10 may have central axis CA, which may correspond to an axis of rotation of one or more spools of engine 10. For example, central axis CA may correspond to an axis of rotation of low-pressure shaft 16. In various embodiments, central axis CA may correspond to an axis of rotation of propeller shaft 32, or propeller shaft 32 may rotate about an axis that is offset from central axis CA.

Figure 2:
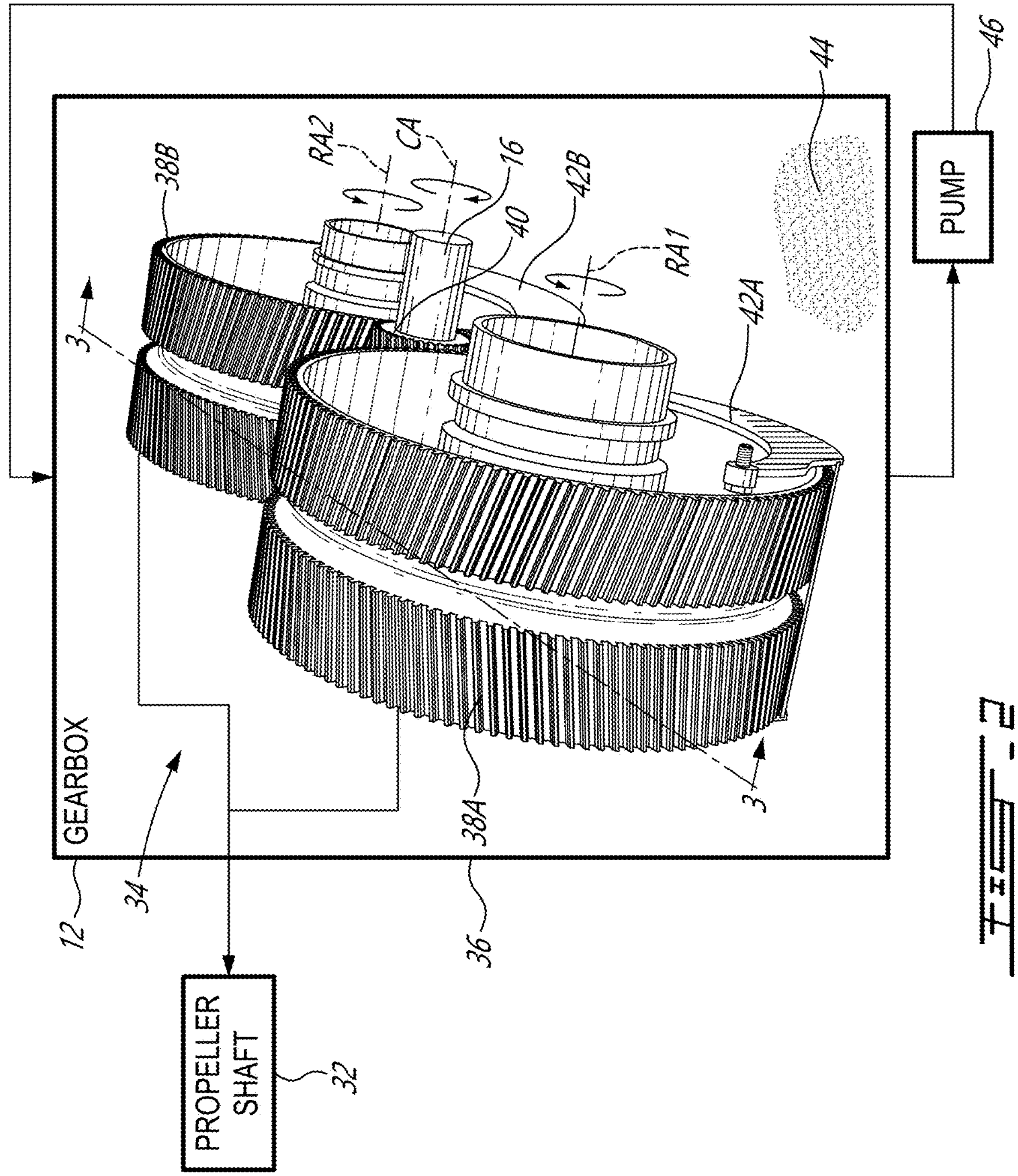
FIG. 2 is a perspective schematic view of part of an exemplary gearbox of the engine of FIG. 1 including two baffle assemblies.

FIG. 2 is a perspective view of an exemplary gear set 34 that may be part of gearbox 12 and that may be disposed inside housing 36 (shown schematically) of gearbox 12. Gear set 34 may be only a subset of gears that are part of gearbox 12. Gear set 34 may include main gears 38A, 38B and input gear 40 drivingly coupled to (i.e., meshed with) both main gears 38A, 38B. Input gear 40 may be coupled to low-pressure shaft 16 and receive an input torque from low-pressure shaft 16. Input gear 40 may drive main gears 38A, 38B, which may be drivingly coupled to propeller shaft 32 via one or more other gears that are not shown in FIG. 2. The relative sizes of (e.g., smaller) input gear 40 and of (e.g., larger) main gears 38A, 38B may provide a rotational speed reduction from low-pressure shaft 16 to propeller shaft 32.

In various embodiments, input gear 40 may be rotatable about central axis CA of engine 10 or about an axis other than central axis CA. Main gears 38A, 38B may be rotatable about respective rotation axes RA1 and RA2 (also referred generally and in the singular herein as "rotation axis RA"). Rotation axes RA1 and RA2 may be substantially parallel to central axis CA. Gearbox 12 may include baffle assembly 42A positioned adjacent to and radially outward of main gear 38A, and optionally another baffle assembly 42B positioned adjacent to and radially outward of main gear 38B. In other words, baffle assembly 42A may shroud a lower part of main gear 38A, and baffle assembly 42B may shroud a lower part of main gear 38B. In some embodiments, input gear 40 and main gears 38A, 38B may each be a double gear having two toothed faces. Even though baffle assemblies 42A, 42B (also referred generally and in the singular herein as "baffle assembly 42") are shown to be associated with respective main gears 38A, 38B (referred generally and in the singular herein as "gear 38") as a non-limiting example, it is understood that baffle assembly 42 may be associated with other types of components (e.g., shafts or other rotors) that interact with lubricating fluid 44.

Gearbox 12 may include one or more lubrication loads such as the meshed interfaces between input gear 40 and main gears 38A, 38B that are serviced by a lubrication system of engine 10. Lubricating fluid 44 may be delivered to one or more locations inside of gearbox 12 via suitable delivery nozzles. Lubricating fluid 44 may then be collected (scavenged) via a sump and recirculated using pump 46. The collected lubricating fluid 44 may undergo processing such as deaerating, filtering, and/or cooling before being recirculated to the same or other lubrication load(s).

Figure 3:
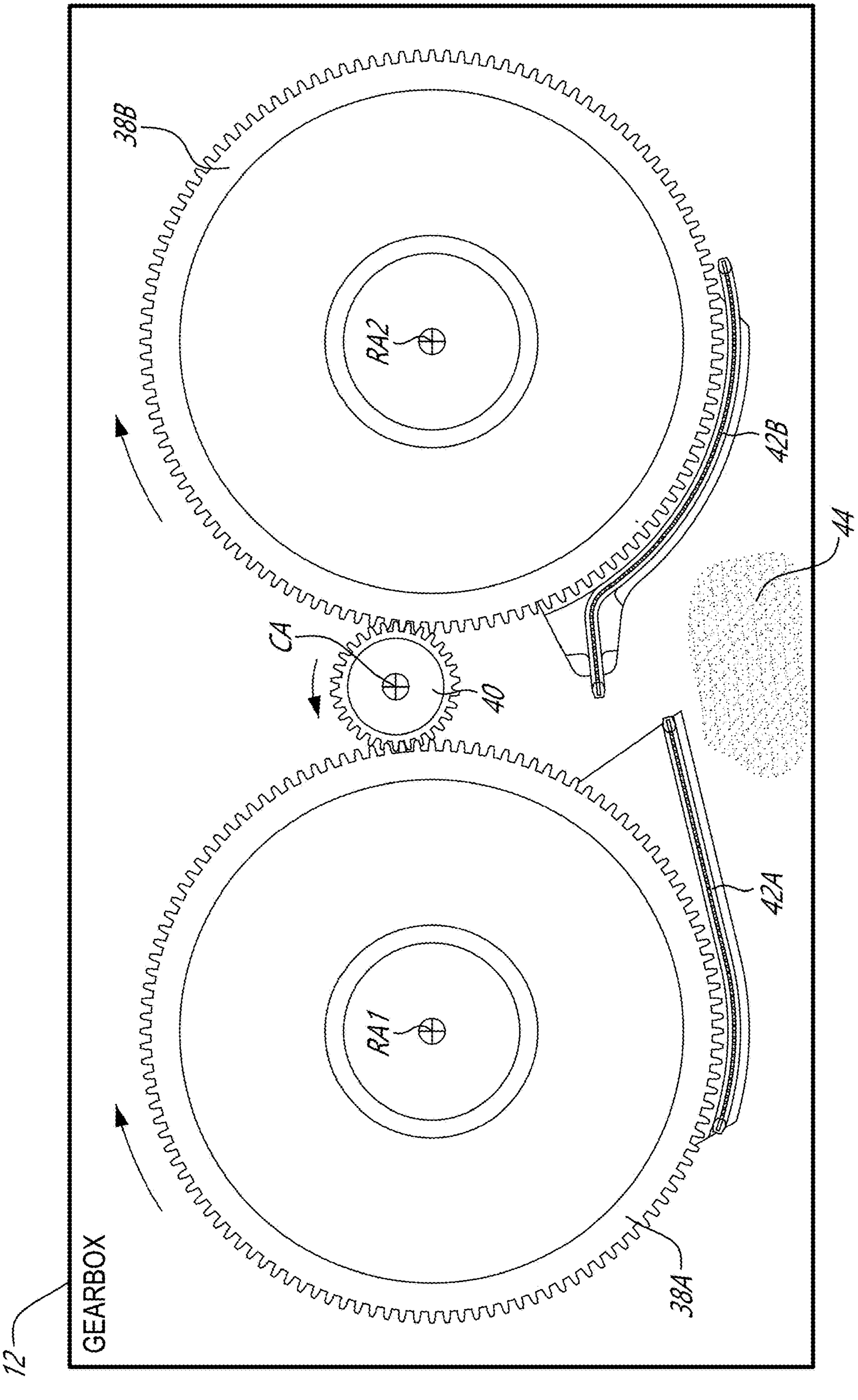
FIG. 3 is a schematic front view of the part of the gearbox of FIG. 2.

FIG. 3 is a schematic front elevation view of the part of gearbox 12 of FIG. 2. Baffle assembly 42A may be installed adjacent to and radially outward of main gear 38A so as to shroud part of main gear 38A. Baffle assembly 42B may be installed adjacent to and radially outward of main gear 38B so as to shroud part of main gear 38B. Baffle assemblies 42A, 42B may interact with a liquid lubricating fluid 44 (e.g., oil) around respective main gears 38A, 38B and control/direct lubricating fluid 44 during operation of gearbox 12. For example, the presence of baffle 56 (shown in FIG. 4) of baffle assembly 42 may prevent excessive misting of lubricating fluid 44 inside of gearbox 12, which would otherwise potentially cause difficulty in scavenging lubricating fluid 44 and returning lubricating fluid 44 to an oil tank, and/or incur energy losses. Baffle 56 may be positioned to intercept lubricating fluid 44 that is flung by gear 38. Baffle 56 may also promote the separation of the air and lubricating fluid 44 within gearbox 12 in some situations. For example, depending on the specific configuration of gearbox 12, baffle 56 may serve as a wind block to protect more sensitive areas of gearbox 12. In some installations, baffle 56 may interact with the mixture of air and lubricating fluid 44. For example, a flow of the mixture of air and lubricating fluid 44 that is intercepted by baffle 56 may pass through baffle 56 via one or more optional perforations 57 (shown in FIG. 4) extending through baffle 56. Alternatively or in addition, a flow of the mixture of air and lubricating fluid 44 may be directed (conveyed) toward a desired location (e.g., sump) inside of gearbox 12 by way of baffle 56.

The geometric configuration of baffle assembly 42 may define a receptacle for receiving a lower portion of gear 38 that is to be shrouded by baffle assembly 42. In some embodiments, some of baffle assembly 42 may be submerged in lubricating fluid 44 during operation of gearbox 12. The positioning, geometry and angular span of baffle assembly 42 may be selected based on the flow conditions of lubricating fluid 44 inside of gearbox 12 during operation of gearbox 12. In various embodiments, baffle assembly 42 may have an angular span about rotation axis RA that is between 10° and 180°, between 45° and 135°, or between 30° and 90° for example.

Figure 4:
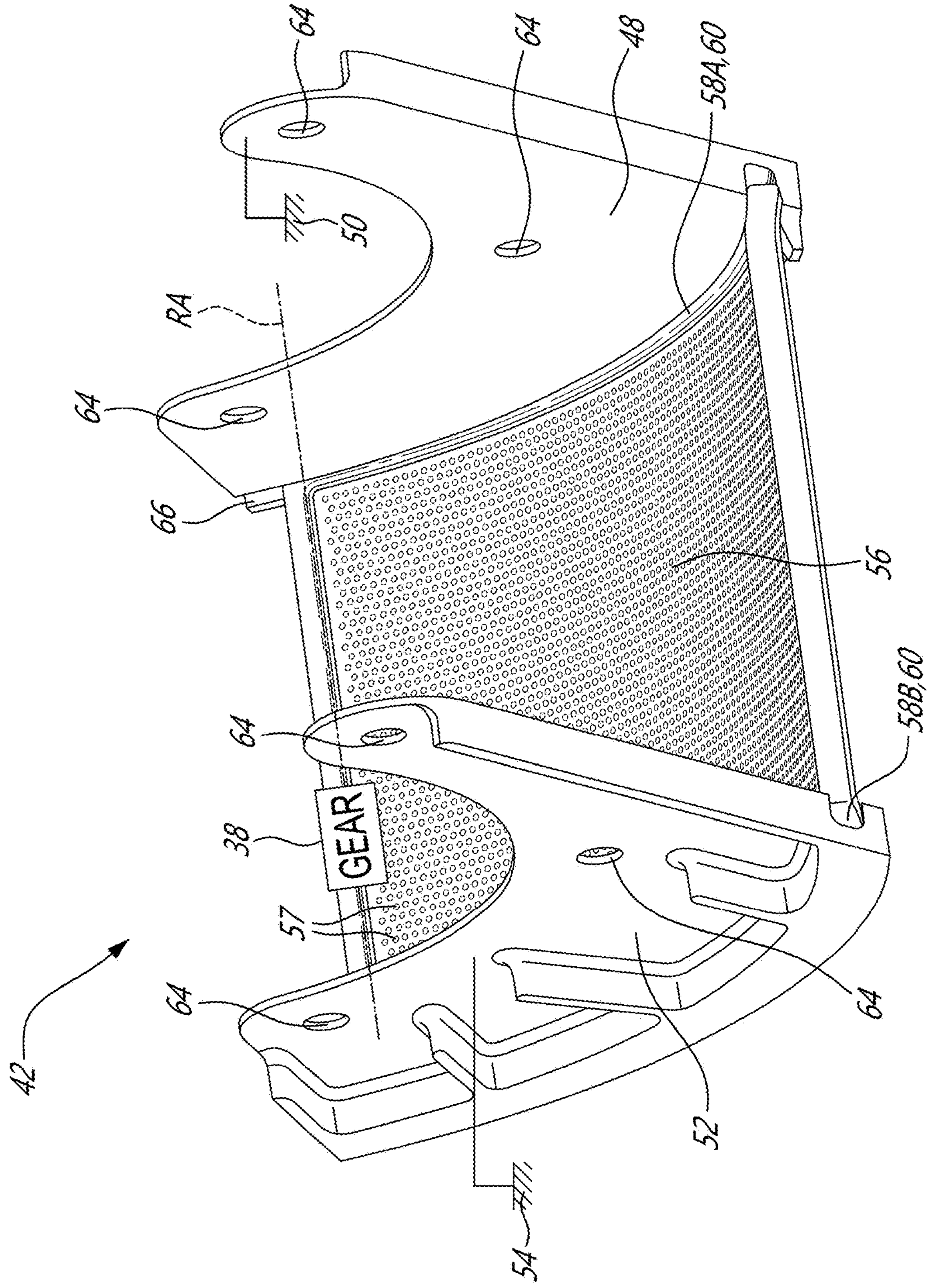
FIG. 4 is a perspective view of an exemplary baffle assembly in an assembled state.

FIG. 4 is a perspective view of an exemplary baffle assembly 42 in an assembled state adjacent to gear 38 (or other rotor), which is shown schematically in FIG. 4. Part of gear 38 may be received inside a receptacle that is defined by the configuration of baffle assembly 42. In other words, baffle assembly 42 may shroud part of gear 38. Baffle assembly 42 may include first sidewall 48 configured to be fastened to first structure 50 disposed to a first axial side of gear 38. Baffle assembly 42 may include second sidewall 52 configured to be fastened to second structure 54 disposed to a second axial side of gear 38 opposite the first axial side of gear 38. Baffle assembly 42 may include baffle 56 supported by and extending between first sidewall 48 and second sidewall 52. During use, baffle 56 may be disposed at a position adjacent to and radially outwardly of gear 38. For example, baffle 56 may be radially spaced apart from a toothed face of gear 38 by a suitable radial gap selected based on flow conditions of lubricating fluid 44 and the configuration of gearbox 12.

In some embodiments, first structure 50 and second structure 54 may be respective (e.g., opposing) walls of housing 36 of gearbox 12. In some embodiments, baffle assembly 42 may not necessarily include both first sidewall 48 and second sidewall 52. For example, baffle 56 may instead be supported by first structure 50 and/or second structure 54 without the intermediate first sidewall 48 and second sidewall 52 being required. In some embodiments, baffle assembly 42 may only include one of first sidewall 48 and second sidewall 52.

Baffle assembly 42 may include means to mitigate (e.g., dampen) vibrations that may be transferred from first structure 50 and/or second structure 54 into baffle assembly 42, and/or vibrations that may be induced into baffle assembly 42 by way of the interaction of baffle 56 with air and lubricating fluid 44 that may be in motion inside of gearbox 12. In some installations, the size of gear 38 and the variations in rotational speed of gear 38 may result in baffle assembly 42 being subjected to vibrations of varying frequencies and magnitudes resulting in one or more vibration modes.

In some embodiments, baffle assembly 42 may have a multi-component construction where first sidewall 48, second sidewall 52 and baffle 56 may be separate components that have been individually manufactured and subsequently assembled together to define baffle assembly 42. The multi-component construction of baffle assembly 42 may facilitate the installation of baffle assembly 42 in a small space within gearbox 12 for example. As explained further below, the multiple components of baffle assembly 42 may allow for the separate components to be installed inside of gearbox 12 in an order that accommodates a wider range of installation constraints.

In some embodiments, baffle 56 and first sidewall 48 may be permanently joined (e.g. welded) together, or baffle 56 and second sidewall 52 may be permanently joined (e.g. welded) together. The term "permanently joined" as used herein is intended to mean that the elements are not intended to be disassembled in a non-destructive manner. In some embodiments, baffle 56 and first sidewall 48 may be integrally formed together, or baffle 56 and second sidewall 52 may be integrally formed together. The term "integrally formed" as used herein is intended to mean that the elements have a unitary (i.e., one-piece) construction. For example, integrally formed elements may be formed together from a same piece of material and have a monolithic construction.

In some embodiments, first sidewall 48 may be configured to be fastened to first structure 50 via one or more (e.g., threaded) fasteners 62 (shown in FIGS. 11A-11C) that extend through respective holes 64 formed through first sidewall 48. Similarly, second sidewall 52 may be configured to be fastened to second structure 54 via one or more (e.g., threaded) fasteners 62 (shown in FIGS. 11A-11C) that extend through respective holes 64 formed through second sidewall 52.

Baffle assembly 42 may include one or more vibration dampers 58A, 58B engaged with baffle 56 to dampen a vibration of baffle 56 during operation of gearbox 12. Various types of vibration dampers may be suitable. In various embodiments, vibration damper(s) 58A, 58B may include one or more polymeric bodies 60 as illustrated herein, one or more metallic bodies, one or more metallic springs, and/or one or more compliant (i.e., flexible) couplings. For example, polymeric body 60 may be made from a suitable elastomer (i.e., a rubbery material composed of long chainlike molecules (e.g., polymer) capable of substantially recovering their original shape after being stretched or compressed) that can withstand exposure to the operating conditions inside of gearbox 12. In some embodiments, polymeric body 60 may be made from a suitable fluorocarbon-based compound having suitable high-temperature resistance and suitable chemical resistance. Vibration dampers 58A, 58B may be made from a different (e.g., softer) material than that of baffle 56 and/or of sidewalls 48, 52. The selection of material and configuration of vibration damper(s) 58A, 58B may be made based on performance requirements. For example, vibration damper(s) 58A, 58B may be designed based on a desired system response to vibration(s) (e.g., to prevent excitation of baffles 56). In some situations, the presence of vibration damper(s) 58A, 58B may allow for the use of baffle 56 having a smaller thickness.

Figure 5:
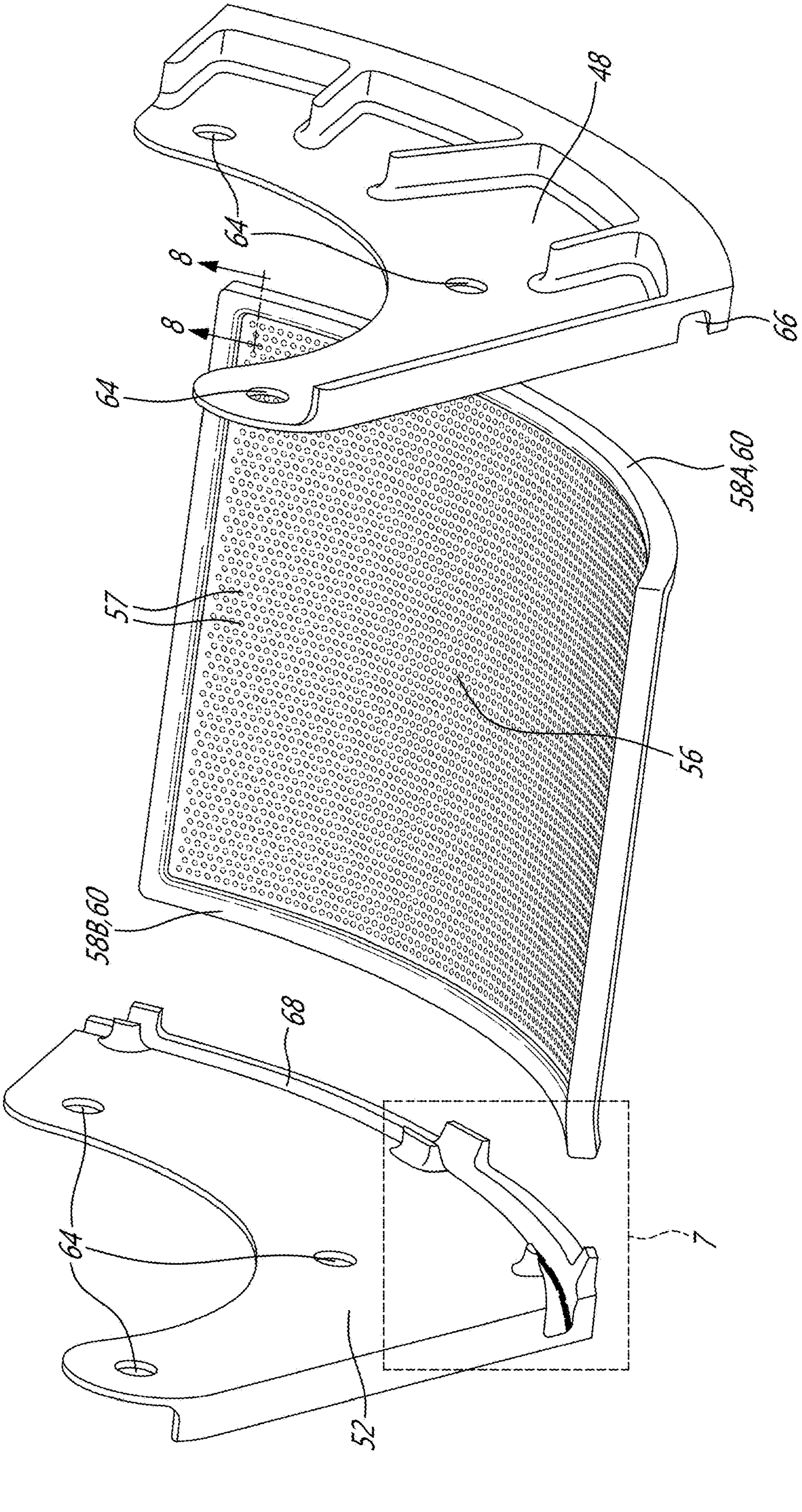
FIG. 5 is a perspective view of the baffle assembly of FIG. 4 in a disassembled state.

FIG. 5 is a perspective view of baffle assembly 42 in a disassembled (i.e., exploded) state where first side wall 48, baffle 56 and second sidewall 52 are disassembled from each other. First side wall 48, baffle 56 and second sidewall 52 may be made from one or more suitable metallic materials (e.g., steel, aluminum) or from a suitable polymer. In some embodiments, first side wall 48 and second sidewall 52 may be machined from stock material. Baffle 56 may be relatively thin component made from a piece of sheet material that has been formed (e.g., curved) to have a desired shape/profile. Baffle 56 may include a plurality of perforations 57 that have been cut through baffle 56 by way of laser drilling, mechanical drilling or punching for example.

Vibration damper(s) 58A, 58B may include one or more polymeric (e.g., elastomeric) bodies 60 that are engaged with baffle 56 and that can dampen vibration of baffle 56 during operation. One or more vibration dampers 58A may be operatively disposed between baffle 56 and first sidewall 48. One or more vibration dampers 58B may be operatively disposed between baffle 56 and second sidewall 52. Vibration damper 58A disposed between baffle 56 and first sidewall 48, and vibration damper 58B disposed between baffle 56 and second sidewall 52 may be separate polymeric bodies 60 or may be part of the same polymeric body 60. In the example illustrated in FIG. 5, a single continuous polymeric body 60 may extend completely around a periphery of baffle 56 and may serve as a vibration damper 58A between baffle 56 and first sidewall 48 and also as a vibration damper 58B between baffle 56 and second sidewall 52.

In some embodiments, polymeric body(ies) 60 may encapsulate one or more edges of baffle 56. Having polymeric body(ies) 60 encapsulate all peripheral edges of baffle 56 may eliminate sharp edges of baffle 56 from being exposed and thereby reduce the risk of injury during handling, installation and/or removal of baffle 56. For the purpose of providing vibration damping between baffle 56 and sidewalls 48, 52, edges of baffle 56 that extend axially between first sidewall 48 and second sidewall 52 may not need to be encapsulated by polymeric body(ies) 60.

In embodiments where polymeric body 60 encapsulates one or more edges of baffle 56, polymeric body 60 may be overmolded onto baffle 56 in liquid form and allowed to cure. Alternatively, a strip of polymeric material having a longitudinal slit formed therein may be installed onto baffle 56 by receiving one or more edges of baffle 56 into the slit so that the edge(s) of baffle 56 is/are encapsulated by polymeric body 60. In some embodiments, polymeric body 60 may not necessarily encapsulate the edge(s) of baffle 56. For example, a strip of polymeric material may be applied to one or both sides of baffle 56 and along the periphery of baffle 56. In various embodiments, polymeric body 60 may be bonded (e.g., glues) to baffle 56.

During assembly of baffle assembly 42, vibration damper 58A (e.g., part of polymeric body 60) may be received into a receptacle such as first channel 66 formed in first sidewall 48. Similarly, vibration damper 58B (e.g., part of polymeric body 60) may be received into a receptacle such as second channel 68 formed in second sidewall 52. In some embodiments, first channel 66 and vibration damper 58A may be sized to define an interference fit between first channel 66 and vibration damper 58A. For example, a radial dimension of first channel 66 may be slightly smaller than a radial dimension of vibration damper 58A so that vibration damper 58A may be (e.g., manually) press-fitted in first channel 66. In some embodiments, second channel 68 and vibration damper 58B may also be sized to define an interference fit between second channel 68 and vibration damper 58B. For example, a radial dimension of second channel 68 may be slightly smaller than a radial dimension of vibration damper 58B so that vibration damper 58B may be (e.g., manually) press-fitted into second channel 68. In some embodiments, first channel 66 and/or second channel 68 may be of sufficient depth so that part(s) (e.g., edge(s)) of baffle 56 may also be received into first channel 66 and/or into second channel 68.

In some installations, one or both sidewalls 48, 52 may not be required. For example, first channel 66 for retaining vibration damper 58A may instead be formed in a first wall of housing 36, and second channel 68 for retaining vibration damper 58B may instead be formed in a second wall of housing 36.

In some embodiments, vibration damper(s) 58A, 58B may instead be first formed or placed into first channel 66 and/or second channel 68, and edges of baffle 56 may subsequently be engaged with vibration damper(s) 58A, 58B during installation.

Figure 6:
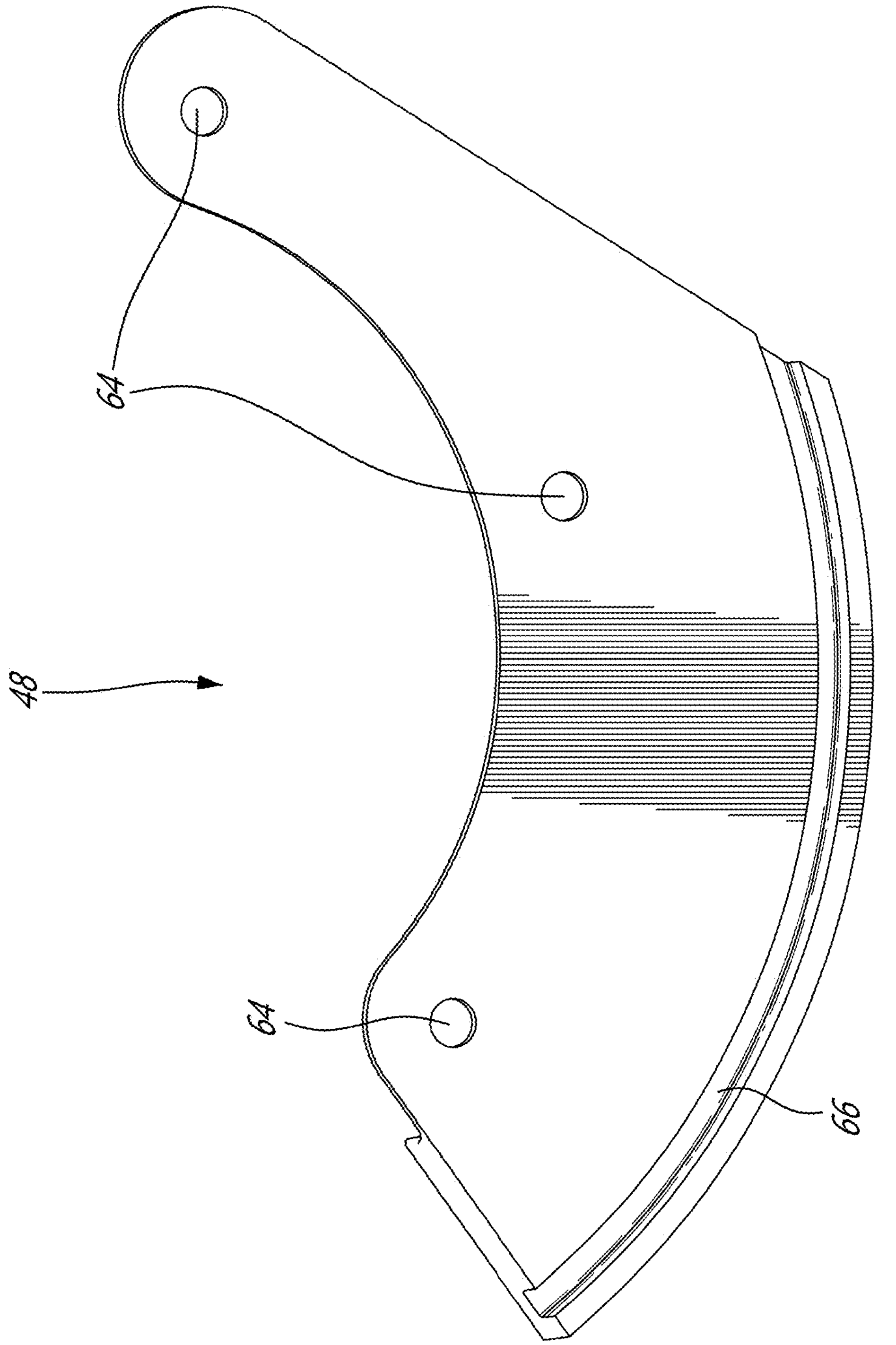
FIG. 6 is a side elevation view of a sidewall of the baffle assembly of FIG. 4.

FIG. 6 is a side elevation view of an axially inner side of first sidewall 48 of baffle assembly 42 of FIG. 4. The installation of baffle assembly 42 into gearbox 12 may include fastening first sidewall 48 to first structure 50 (e.g., housing 36) before installing gear 38. In other words, gear 38 may be installed after installing first sidewall 48 and before installing second sidewall 52. Before or after fastening first sidewall 48 to first structure 50, baffle 56 may be installed with first sidewall 48 by maintenance personnel having suitable visibility of baffle 56 and first sidewall 48. Accordingly, vibration damper 58A and optionally part of baffle 56 may be inserted into first channel 66, which may be a groove formed (e.g., machined) into first sidewall 48. The interference fit between vibration damper 58A and first channel 66 may cause baffle 56 to be retained together with first sidewall 48 to facilitate the subsequent installation of second sidewall 52. First channel 66 may have a shape that matches a (e.g., arcuate or other) side profile of baffle 56.

Figure 7:
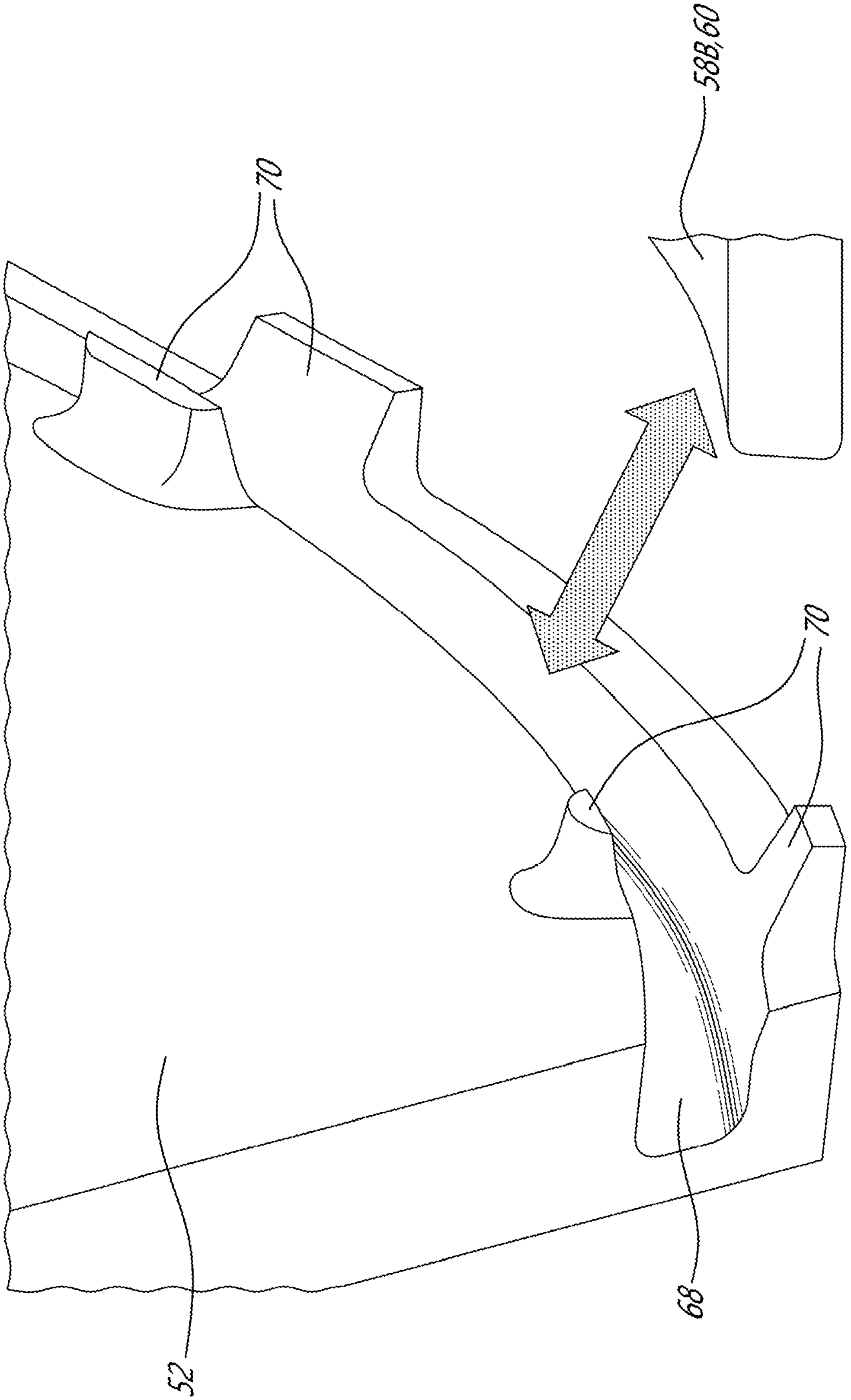
FIG. 7 is an enlarged view of region 7 in FIG. 5.

FIG. 7 is an enlarged view of region 7 in FIG. 5. In reference to FIGS. 5 and 7, second sidewall 52 may be fastened to second structure 54, which may be a removable cover that is part of housing 36 of gearbox 12 and that is installed only after gear 38 and first sidewall 48 have been installed and after baffle 56 is being retained with first sidewall 48. Accordingly, during the installation of second sidewall 52 with baffle 56, maintenance personnel may not have visibility on the insertion of vibration damper 58B into second channel 68. In order to facilitated the insertion of vibration damper 58B into second channel 68 and to accommodate some potential initial misalignment, second sidewall 52 may include one or more guide surfaces 70 for leading vibration damper 58B toward second channel 68 during assembly of baffle 56 with second sidewall 52. During installation, guide surface(s) 70 may initially engage with vibration damper 58B and align vibration damper 58B with second channel 68 to facilitate mating of vibration damper 58B with second channel 68. Guide surface(s) 70 may serve as lead-in chamfers. In other words, guide surface(s) 70 may be configured to funnel vibration damper 58B toward second channel 68 when maintenance personnel does not have visibility of second channel 68. Alternatively or in addition, similar or identical guide surface(s) may be provided on first sidewall 48 to funnel vibration damper 58A toward first channel 66 to facilitate insertion of vibration damper 58A into first channel 66.

Figure 8:
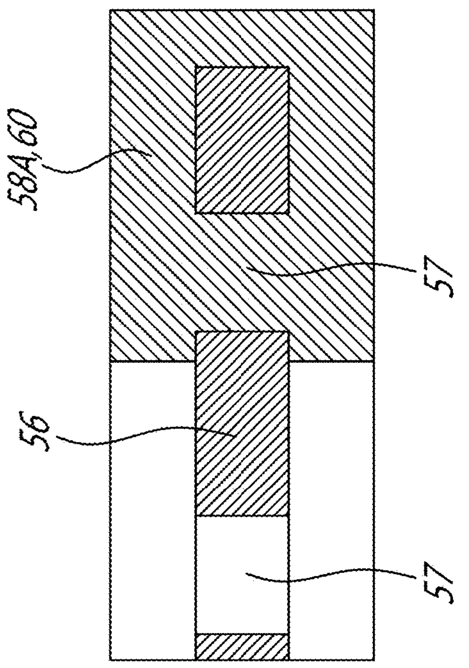
FIG. 8 is a schematic cross-sectional view of a baffle of the baffle assembly taken along line 8-8 in FIG. 5.

FIG. 8 is a schematic cross-sectional view through baffle 56 and vibration damper 58A taken along line 8-8 in FIG. 5. In some embodiments, vibration damper 58B may have an identical configuration. Polymeric body 60 may encapsulate one or more edges of baffle 56 and may be applied to baffle 56 by overmolding. In some embodiments, polymeric body 60 may penetrate one or more perforations 57 defined through baffle 56. As shown in FIG. 8, one or more perforations 57 may be filled with material (e.g., polymer) from polymeric body 60 and one or more perforations 57 may be empty to permit the passage of lubricating fluid 44 through baffle 56 during use. The engagement of polymeric body 60 with one or more perforations 57 may promote adhesion between polymeric body 60 and baffle 56.

Figure 9:
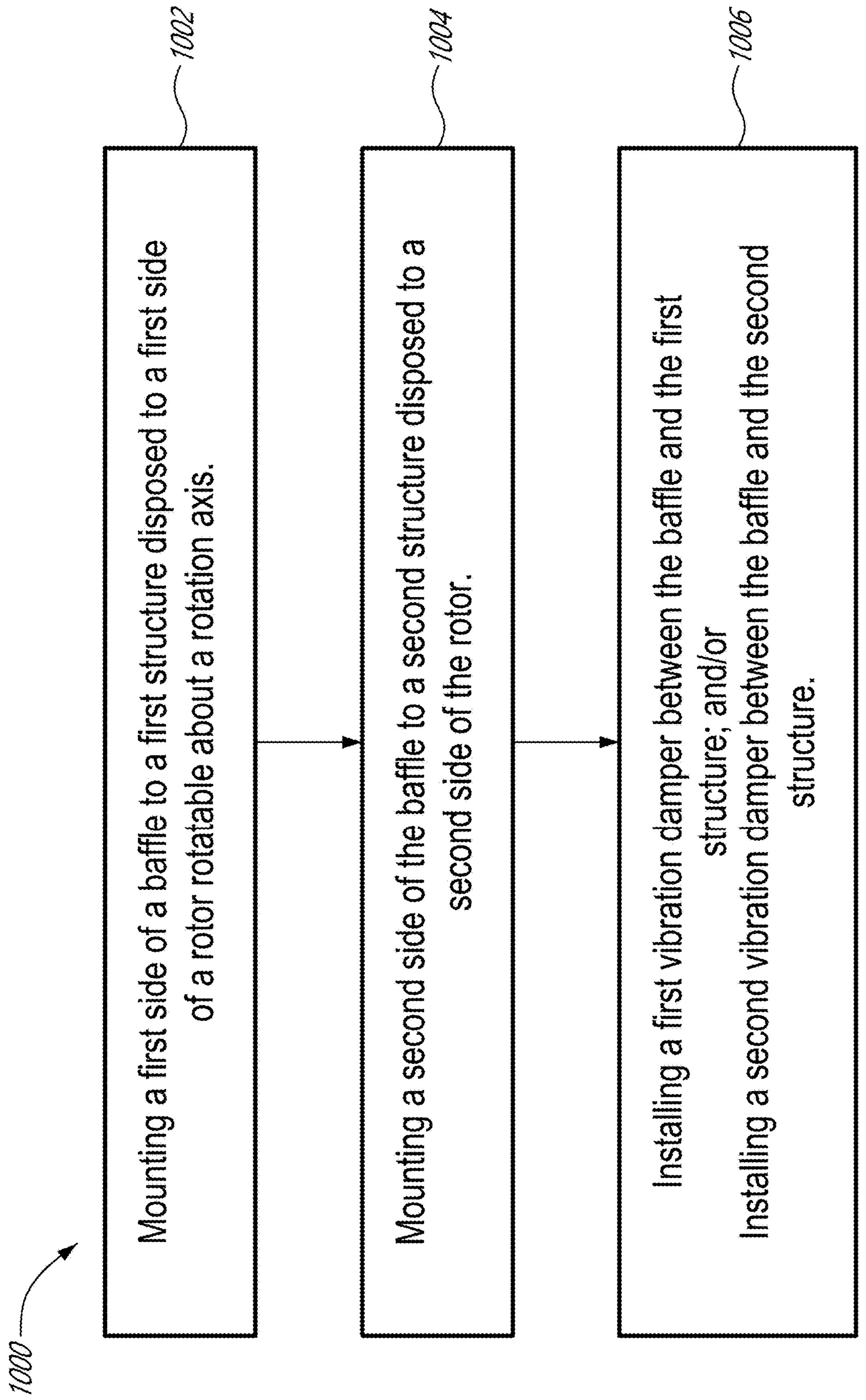
FIG. 9 is a flow diagram of an exemplary method of installing a baffle for interacting with a lubricating fluid in an aircraft power plant.

FIG. 9 is a flow diagram of an exemplary method 1000 of installing baffle 56 or other baffle for interacting with a lubricating fluid in an aircraft power plant. Method 1000 may be performed using baffle 56 and optionally using one or other components of baffle assembly 42 described herein. Accordingly, elements of baffle assembly 42 may be incorporated into method 1000. Method 1000 may also include other actions disclosed herein. In various embodiments, method 1000 may include:

mounting a first side of baffle 56 to first structure 50 disposed to a first side of a rotor (e.g., gear 38) rotatable about rotation axis RA (block 1002); and mounting a second side of baffle 56 to second structure 54 disposed to a second side of the rotor (e.g., gear 38) so that baffle 56 is positioned adjacent to and radially outward of the rotor during use, second structure 54 may be axially spaced apart from first structure 50 by an axial distance along rotation axis RA of the rotor (block 1004), wherein:

mounting the first side of baffle 56 may include installing vibration damper 58A between baffle 56 and first structure 50 (block 1006); and/or mounting the second side of baffle 56 may include installing vibration damper 58B between baffle 56 and second structure 54 (block 1006).

In some embodiments, the axial distance between first structure 50 and second structure 54 along rotation axis RA may be greater than an axial thickness of gear 38 for example. In some embodiments, method 1000 may include both installing vibration damper 58A between baffle 56 and first structure 50, and installing vibration damper 58B between baffle 56 and second structure 54. Mounting the first side of baffle 56 to first structure 50 may include fastening first sidewall 48 to first structure 50, and inserting vibration damper 58A into a receptacle such as first channel 66 defined in first sidewall 48. Mounting the second side of baffle 56 to second structure 54 may include fastening second sidewall 52 to second structure 54, and inserting vibration damper 58B into a receptacle such as second channel 68 defined in second sidewall 52. As explained above, vibration damper 58A may encapsulate a first edge of baffle 56, and vibration damper 58B may encapsulate a second edge of baffle 56.

In some embodiments, the rotor such as gear 38 may be installed during the installation of baffle assembly 42. For example, the rotor may be installed between two steps of the installation of baffle assembly 42. In some embodiments, the rotor may be installed after mounting the first side of baffle 56 to first structure 50 and before mounting the second side of baffle 56 to second structure 54.

Figure 10:
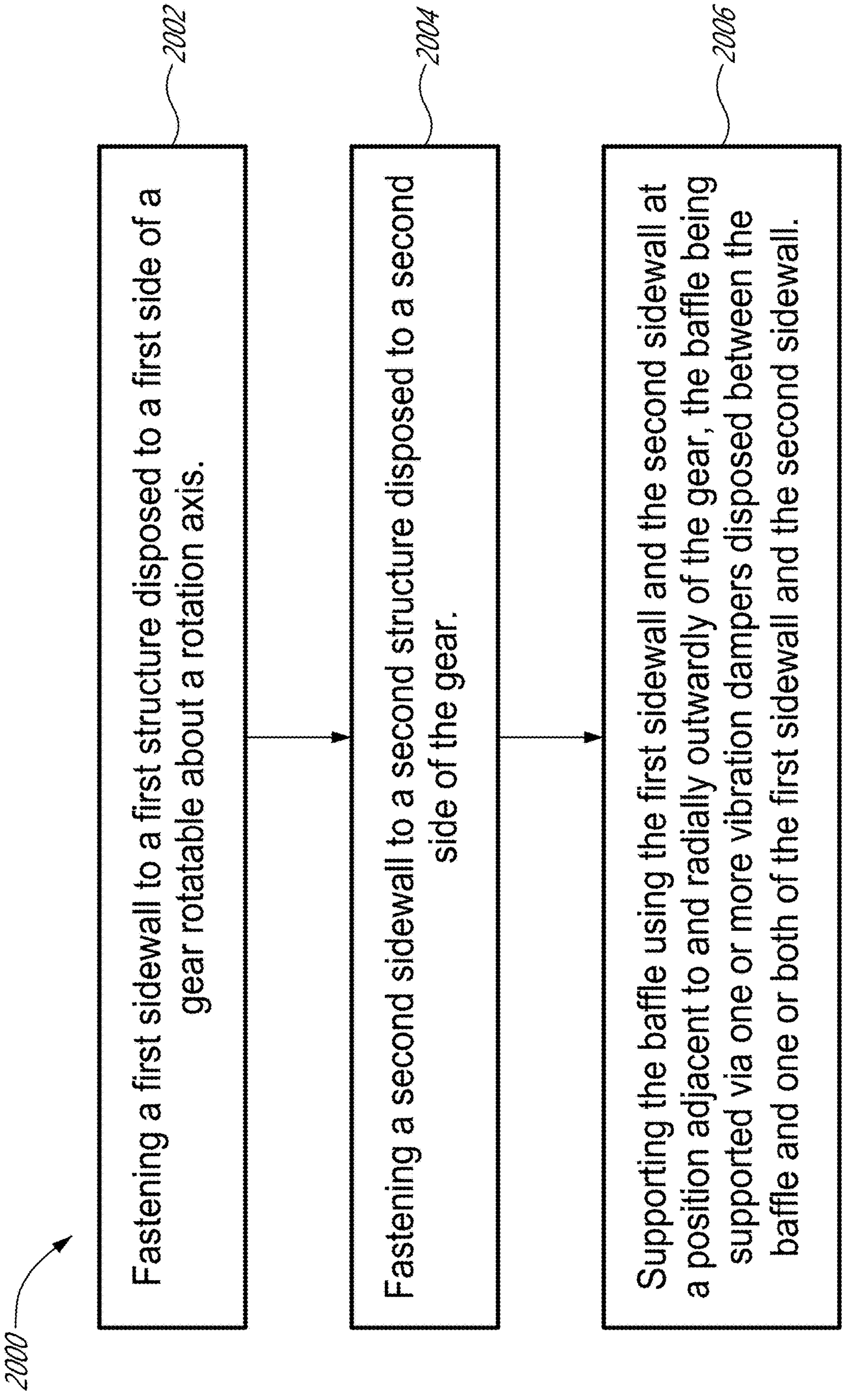
FIG. 10 is a flow diagram of an exemplary method of installing a baffle inside a gearbox of an aircraft power plant.

FIG. 10 is a flow diagram of an exemplary method 2000 of installing baffle 56 or other baffle inside gearbox 12 or another gearbox of an aircraft power plant. Method 2000 may be performed using baffle 56 and optionally using one or other components of baffle assembly 42 described herein. Accordingly, elements of baffle assembly 42 may be incorporated into method 2000. Method 2000 may also include other actions disclosed herein. In various embodiments, method 2000 may include:

fastening first sidewall 48 to first structure 50 disposed to a first side of gear 38 rotatable about rotation axis RA (block 2002);

fastening second sidewall 52 to second structure 54 disposed to a second side of gear 38, second sidewall 52 may be axially spaced apart from first sidewall 48 by an axial distance along rotation axis RA of gear 38 (block 2004); and supporting baffle 56 using first sidewall 48 and second sidewall 52 at a position adjacent to and radially outwardly of gear 38, supporting baffle 56 including supporting baffle 56 via one or more vibration dampers 58A, 58B disposed between baffle 56 and one or both of first sidewall 48 and second sidewall 52 (block 2006).

In embodiments where vibration damper(s) 58A, 58B include one or more resilient bodies such as polymeric body(ies) 60 encapsulating an edge of baffle 56, method 2000 may include receiving at least part of resilient polymeric body 60 and optionally the edge of baffle 56 in a receptacle such as first channel 66 defined in first sidewall 48 and second channel 68 defined in second sidewall 52.

Figure 11A:
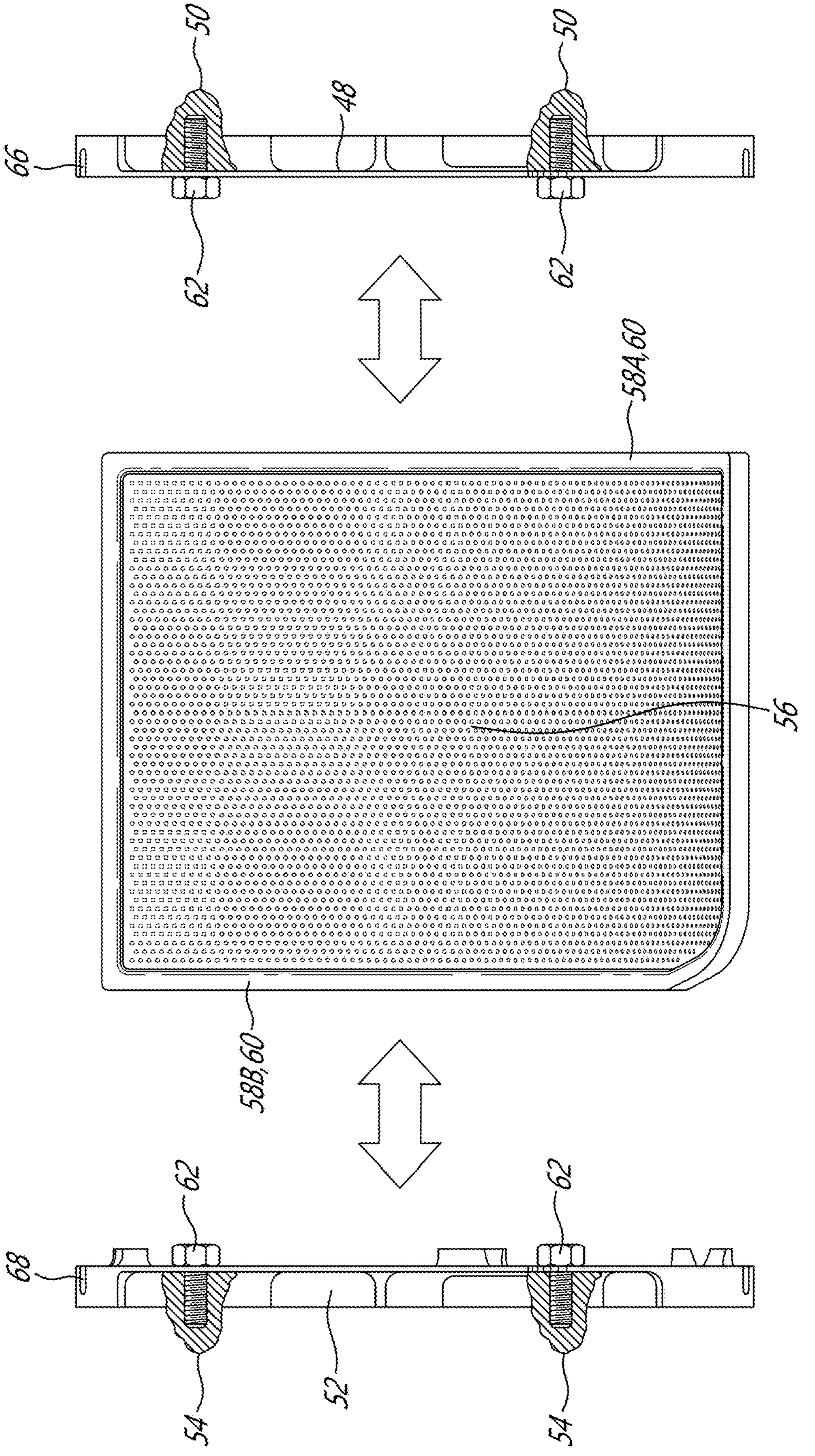
FIGS. 11A-11C illustrate methods of installing the baffle assembly in an aircraft power plant.
Figure 11B:
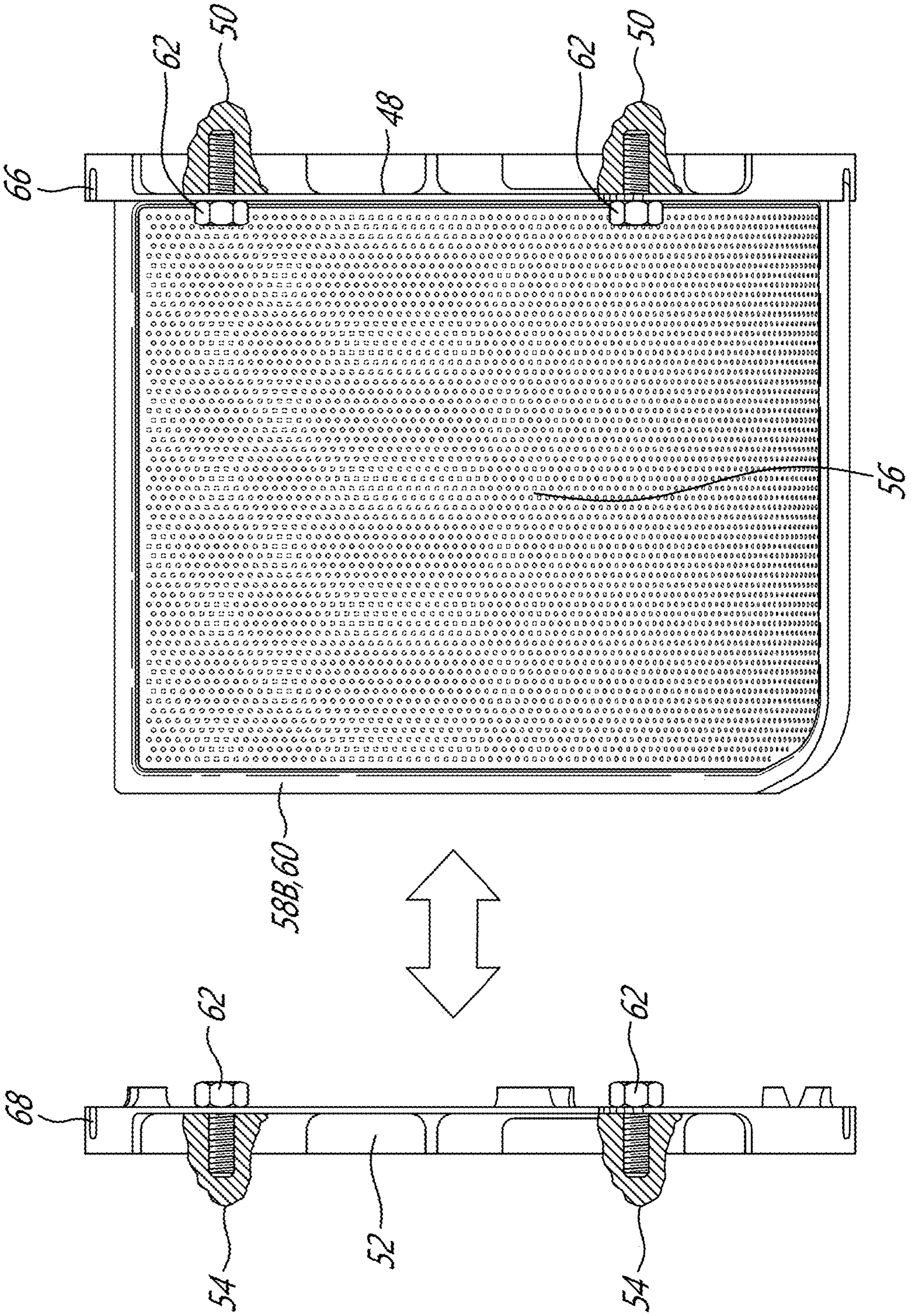
Figure 11C:
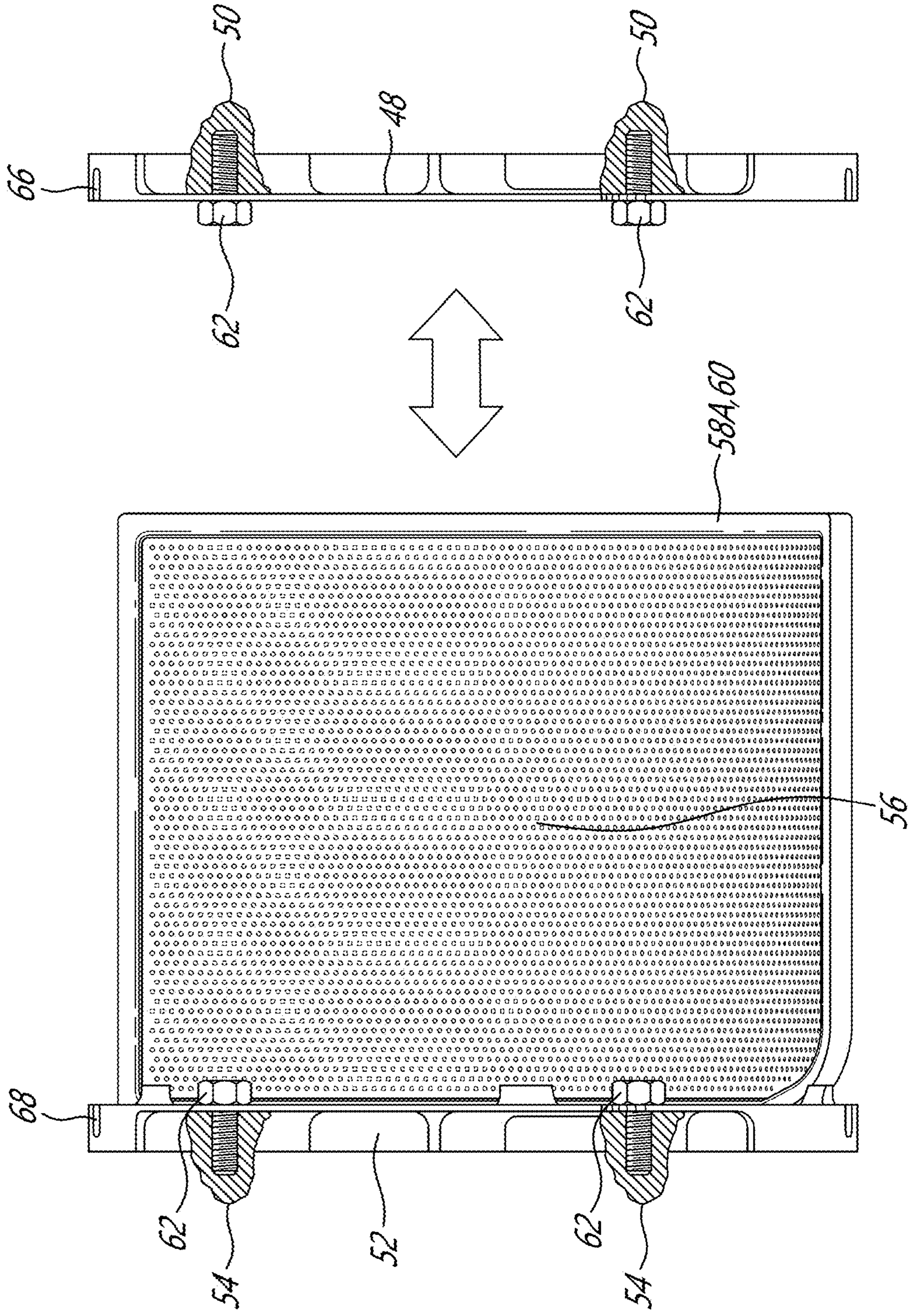

FIGS. 11A-11C illustrate methods of installing baffle assembly 42 in an aircraft power plant. The methods illustrated in FIGS. 11A-11C may be encompassed by methods 1000 and 2000. The multi-component construction of baffle assembly 42 may provide flexibility of installation to accommodate different installation (e.g., space) constraints. For example, the multi-component construction of baffle assembly 42 may permit different sequences of operation to be used to assemble baffle assembly 42.

FIG. 11A illustrates that baffle 56 may be mounted to first sidewall 48 by either moving baffle 56 toward first sidewall 48 or moving first sidewall 48 toward baffle 56 to cause vibration damper 58A to be received into and retained inside of first channel 66. FIG. 11A also illustrates that baffle 56 may be mounted to second sidewall 52 by either moving baffle 56 toward second sidewall 52 or moving second sidewall 52 toward baffle 56 to cause vibration damper 58B to be received into and retained inside of second channel 68.

FIG. 11B illustrates that baffle 56 may first be installed with first sidewall 48 prior to being installed with second sidewall 52. FIG. 11C illustrates that baffle 56 may instead first be installed with second sidewall 52 prior to being installed with first sidewall 48. The configuration of baffle assembly 42 may permit the installation of gear 38 or other components of gearbox 12 between steps of installation of baffle assembly 42.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A baffle assembly for interacting with a lubricating fluid around a rotor in an aircraft power plant, the baffle assembly comprising:
- a first sidewall configured to be fastened to a first structure disposed to a first side of the rotor;
- a second sidewall configured to be fastened to a second structure disposed to a second side of the rotor axially opposite the first side of the rotor;
- a baffle supported by and extending between the first sidewall and the second sidewall, and to be disposed at a position adjacent to and radially outwardly of the rotor during use; and
- a vibration damper engaged with the baffle to dampen a vibration of the baffle during use, wherein:
- the vibration damper includes an elastomeric body engaged with the baffle; and
- the elastomeric body penetrates a perforation defined in the baffle.

2. The baffle assembly as defined in claim 1, wherein the elastomeric body is received into a receptacle defined in the first sidewall.

3. The baffle assembly as defined in claim 2, wherein the elastomeric body encapsulates an edge of the baffle.

4. The baffle assembly as defined in claim 3, wherein the elastomeric body extends completely around a periphery of the baffle.

5. The baffle assembly as defined in claim 2, wherein the elastomeric body is press-fitted in the receptacle defined in the first sidewall.

6. The baffle assembly as defined in claim 1, wherein the vibration damper is disposed between the baffle and the first sidewall.

7. The baffle assembly as defined in claim 6, wherein:
- the vibration damper is a first vibration damper; and
- the baffle assembly includes a second vibration damper disposed between the baffle and the second sidewall.

8. The baffle assembly as defined in claim 7, wherein:
- the first vibration damper and the second vibration damper are part of a polymeric body encapsulating a peripheral edge of the baffle;
- the polymeric body is received into a first channel defined in the first sidewall; and
- the polymeric body is received into a second channel defined in the second sidewall.

9. The baffle assembly as defined in claim 8, wherein the second sidewall includes a guide surface for leading the polymeric body toward the second channel during assembly of the baffle with the second sidewall.

10. The baffle assembly as defined in claim 8, wherein the first channel and the polymeric body are sized to define an interference fit between the first channel and the polymeric body.

11. A baffle assembly for interacting with a lubricating fluid around a rotor in an aircraft power plant, the baffle assembly comprising:
- a first sidewall configured to be fastened to a first structure disposed to a first side of the rotor;
- a second sidewall configured to be fastened to a second structure disposed to a second side of the rotor axially opposite the first side of the rotor;
- a baffle supported by and extending between the first sidewall and the second sidewall, and to be disposed at a position adjacent to and radially outwardly of the rotor during use; and
- a vibration damper engaged with the baffle to dampen a vibration of the baffle during use, wherein:
- the vibration damper includes an elastomeric body engaged with the baffle;
- the elastomeric body is received into a receptacle defined in the first sidewall;
- the elastomeric body encapsulates an edge of the baffle; and
- the elastomeric body extends completely around a periphery of the baffle.

12. The baffle assembly as defined in claim 11, wherein the elastomeric body is press-fitted in the receptacle defined in the first sidewall.

13. A baffle assembly for interacting with a lubricating fluid around a rotor in an aircraft power plant, the baffle assembly comprising:
- a first sidewall configured to be fastened to a first structure disposed to a first side of the rotor;
- a second sidewall configured to be fastened to a second structure disposed to a second side of the rotor axially opposite the first side of the rotor;
- a baffle supported by and extending between the first sidewall and the second sidewall, and to be disposed at a position adjacent to and radially outwardly of the rotor during use; and
- a vibration damper engaged with the baffle to dampen a vibration of the baffle during use, wherein:
- the vibration damper is disposed between the baffle and the first sidewall;
- the vibration damper is a first vibration damper;
- the baffle assembly includes a second vibration damper disposed between the baffle and the second sidewall;
- the first vibration damper and the second vibration damper are part of a polymeric body encapsulating a peripheral edge of the baffle;
- the polymeric body is received into a first channel defined in the first sidewall; and
- the polymeric body is received into a second channel defined in the second sidewall.

14. The baffle assembly as defined in claim 13, wherein the second sidewall includes a guide surface for leading the polymeric body toward the second channel during assembly of the baffle with the second sidewall.

15. The baffle assembly as defined in claim 13, wherein the first channel and the polymeric body are sized to define an interference fit between the first channel and the polymeric body.

* * * * *